(12) United States Patent
Ritter et al.

(10) Patent No.: US 7,218,086 B1
(45) Date of Patent: May 15, 2007

(54) SWITCHING REGULATOR WITH PROGRAMMABLE OUTPUT LEVELS USING A SINGLE INPUT PIN

(75) Inventors: David W. Ritter, San Jose, CA (US);
Bruce Hennig, Pleasanton, CA (US);
Ralf J. Muenster, Campbell, CA (US)

(73) Assignee: Micrel, Inc., San Jose, CA (US)

( * ) Notice: Subject to any disclaimer, the term of this patent is extended or adjusted under 35 U.S.C. 154(b) by 0 days.

(21) Appl. No.: 11/381,092

(22) Filed: May 1, 2006

(51) Int. Cl.
*G05F 5/00* (2006.01)
(52) U.S. Cl. .................. 323/303; 323/284; 323/299
(58) Field of Classification Search ................ 323/303, 323/299, 282, 284, 286
See application file for complete search history.

(56) References Cited

U.S. PATENT DOCUMENTS

| | | | |
|---|---|---|---|
| 6,204,654 B1 * | 3/2001 | Miranda et al. | 323/316 |
| 6,281,668 B1 * | 8/2001 | Sudo | 323/299 |
| 6,300,751 B1 * | 10/2001 | Sudo | 323/299 |
| 6,593,725 B1 * | 7/2003 | Gallagher et al. | 323/284 |
| 7,002,331 B2 * | 2/2006 | Sae-Ueng et al. | 323/299 |
| 7,095,215 B2 * | 8/2006 | Liu et al. | 323/222 |

* cited by examiner

*Primary Examiner*—Bao Q. Vu
(74) *Attorney, Agent, or Firm*—Patent Law Group LLP; Carmen C. Cook

(57) ABSTRACT

A switching regulator provides programming output current control through a single input terminal by modifying the reference voltage in the control loop of the switching regulator. The switching regulator includes a first input terminal receiving a program input voltage indicative of a desired output current, a voltage divider receiving a first reference voltage and providing a second reference voltage at a first node between the first and second resistors and a third reference voltage at a second node between the second and third resistors, and a precision active pulldown circuit coupled to receive the program input voltage and operative to pull down the second reference voltage at the first node in response to the program input voltage. In operation, the third reference voltage is used in the control loop of the switching regulator to control the output current of the switching regulator in response to the program input voltage.

12 Claims, 2 Drawing Sheets

SWITCHING REGULATOR WITH PROGRAMMABLE OUTPUT LEVELS USING A SINGLE INPUT PIN

FIELD OF THE INVENTION

The invention relates to switching regulators and, in particular, to a PWM switching regulator with programmable output levels programmed by a single program pin.

DESCRIPTION OF THE RELATED ART

DC voltage regulators or switching regulators operate to convert energy from one DC voltage level to another DC voltage level. A switching regulator, sometimes referred to as a switching mode power supply, provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

The operation of the switching regulator is well known and is generalized as follows. A power switch is turned on to apply energy to an inductor to allow the current through the inductor to build up. When the power switch is turned off, the voltage across the inductor reverses and charges are transferred onto an output capacitor and the load. A relatively constant output voltage is maintained by the output capacitor. Switching regulators are operated under various control schemes. For instance, commonly used control schemes include constant frequency or variable frequency pulse width modulation (PWM) control.

One application of a PWM boost switching regulator is to provide current for driving light emitting devices, such as a white LED (light emitting diode) photoflash or an LED light source for small displays (such as a mobile phone). In this application, the boost switching regulator is optimized for constant current control and must be capable of providing sufficiently high current levels, such as 1 A, to drive the light emitting devices to ensure high level of brightness.

When the PWM boost switching regulator is used in a photoflash application, the switching regulator often needs to support four desirable operating modes of the photoflash: Off, Precharge, Torch, and Flash. In the Off mode, the output current of the switching regulator is zero and the internal circuitry of the switching regulator is to be disabled so that they consume nearly zero current. In the Flash mode, the switching regulator is operated at full output current to ensure maximum brightness output.

In the Precharge mode, the switching regulator is operated at a minimal output current level. The purpose of the Precharge mode is to establish an operating point, by setting a certain voltage on critical circuit elements such as the output capacitor and the compensation capacitor, that is near to the Flash mode operating point. Accordingly, transitioning the photoflash from the Precharge mode to the Flash mode can be much faster than transitioning the flash from the Off mode to the Flash mode. The precise current output for the Precharge mode is not critical and can be internally set in the switching regulator.

Finally, in the Torch mode, the switching regulator is operated at a reduced output current level which can be set by the user. That is, the user can select a desired reduced output current level for a particular application. The reduced output current level for the Torch mode is higher than the precharge current level of the Precharge mode. In order to support the Torch mode of operation, conventional switching regulators require using an additional input pin to receive an input signal for indicating the desired current level selected for the Torch mode. The use of an additional pin increases manufacturing cost and complexity of the switching regulator integrated circuit.

SUMMARY OF THE INVENTION

According to one embodiment of the present invention, a switching regulator provides programming output current control through a single input terminal by modifying the reference voltage in the control loop of the switching regulator. The switching regulator receives an input voltage and includes a power switch controlled by a control loop to generate a switching output voltage and an output circuit coupled to receive the switching output voltage and to supply an output current at a regulated output voltage to a load. In accordance with one embodiment of the present invention, the switching regulator includes a first input terminal receiving a program input voltage indicative of a desired output current to be provided to the load where the program input voltage has voltages values between and including the input voltage and a first power supply reference voltage, and a voltage divider including first, second and third resistors connected in series between a first reference voltage and the first power supply reference voltage where the voltage divider provides a second reference voltage at a first node between the first and second resistors and a third reference voltage at a second node between the second and third resistors. Finally, the switching regulator includes a precision active pulldown circuit coupled to receive the program input voltage and operative to pull down the second reference voltage at the first node in response to the program input voltage. In operation, the third reference voltage is used in the control loop of the switching regulator to control the output current of the switching regulator in response to the program input voltage.

The present invention is better understood upon consideration of the detailed description below and the accompanying drawings.

DETAILED DESCRIPTION OF THE PREFERRED EMBODIMENTS

In accordance with the principles of the present invention, a switching regulator capable of providing programmable output current levels using a single input pin includes a reference voltage control circuit for modifying the reference voltage used in the switching regulator control loop in response to an input signal received on the input pin. The input pin is disposed to receive input signals indicative of three or more desired output current levels for the switching regulator so that the switching regulator of the present invention can be programmed to multiple output current levels using a single input pin. In one embodiment, the input pin is disposed to receive input signals indicative of two digital input states and one analog input state. Accordingly, the reference voltage control circuit of the switching regulator receives input signals from the single input pin indicating either a digital or an analog input condition and causes the switching regulator control loop to generate an output current having the desired output current level as indicated by the input signals.

In one embodiment, the switching regulator of the present invention is applied in a photoflash driver system for driving a photoflash and for operating the photoflash in one of four operation modes: Off, Precharge, Torch and Flash. More specifically, the switching regulator of the present invention incorporating the reference voltage control circuit implements an analog input function for the Torch mode and two digital functions for the Precharge and Flash modes on a single input pin. Thus, a user can program a desired reduced output current level for use in the Torch mode through the input pin while providing Precharge and Flash mode control through the same input pin. The switching regulator of the present invention achieves integration of the analog Torch mode control with the digital Precharge and Flash mode control on a single pin, thereby increasing the functionality of the switching regulator without increasing the manufacturing cost.

In the following description, the switching regulator of the present invention is described as being applied in a photoflash application. The use of the switching regulator of the present invention for driving a photoflash is illustrative only and is not intended to be limiting. One of ordinary skill in the art, upon being apprised of the present invention, would appreciate that the switching regulator of the present invention can be applied in other applications where the use of a single input pin to select three or more programmable output current levels is desired.

Figure 1:
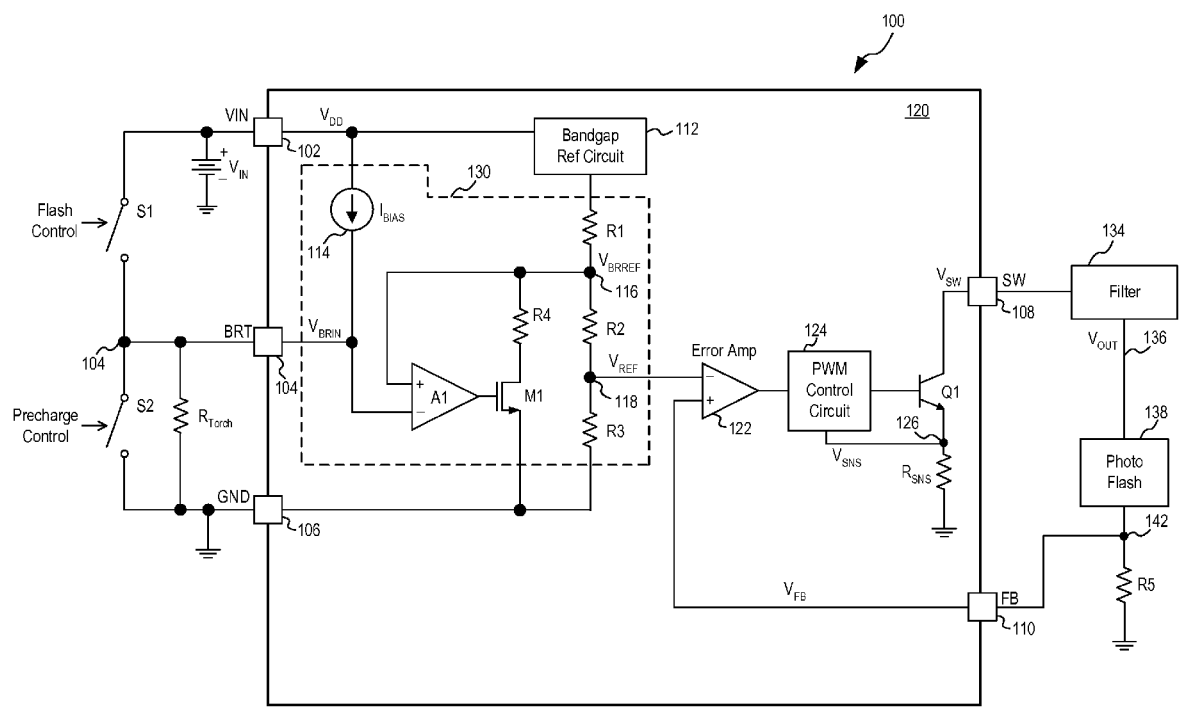
FIG. 1 is circuit diagram of a photoflash driver system incorporating a switching regulator according to one embodiment of the present invention.

FIG. 1 is circuit diagram of a photoflash driver system incorporating a switching regulator according to one embodiment of the present invention. Referring to FIG. 1, a photoflash driver system includes a switching regulator 120 receiving an input voltage $V_{IN}$ on an input terminal VIN (node 102), a reference (ground) voltage on an input terminal GND (node 106) and providing a switching output voltage $V_{SW}$ on an output terminal SW (node 108). The switching output voltage $V_{SW}$ is coupled to a filter circuit 134 to generate an output voltage $V_{OUT}$ (node 136) having substantially constant magnitude. The configuration of the filter circuit is well known in the art and generally includes inductor, capacitor and diode elements. For the purpose of the present application, the output voltage $V_{OUT}$ of the switching regulator 120 is coupled to drive a photoflash 138. An exemplary embodiment of the filter circuit and an exemplary configuration of the photoflash will be described in more detail below with reference to FIG. 2.

Switching regulator 120 provides a substantially constant output voltage $V_{OUT}$ and supplies a drive current to drive photoflash 138. To complete the switching regulator control loop, photoflash 138 is coupled to a resistor R5 to develop a feedback voltage $V_{FB}$ which is coupled back to switching regulator 120 through a feedback terminal FB (node 110). In switching regulator 120, the feedback voltage $V_{FB}$ is coupled to an error amplifier 122 to be compared with a reference voltage $V_{REF}$. Error amplifier 122 provides an error output signal for driving a PWM control circuit 124.

PWM control circuit 124 in turn controls the on-off cycle of a power switch Q1 to generate the switching output voltage $V_{SW}$ on node 108, thereby completing the feedback control loop in switching regulator 120. In the present illustration, the power switch of the switching regulator is implemented as an NPN bipolar transistor Q1 but other transistor types, such as MOS transistors, can be used to implement the power switch, as is well known in the art. A current sense circuit is typically coupled to the power switch to sense the current flowing through the power switch. In the present illustration, a sense resistor $R_{SNS}$, coupled between the emitter terminal of bipolar transistor Q1 and the ground voltage, provides a sense voltage $V_{SNS}$ on a node 126 which is coupled to the PWM control circuit 124 which uses the sense voltage signal and the error voltage signal to control the switching cycle of the power switch.

In a conventional switching regulator, the reference voltage $V_{REF}$ is generated from a bandgap voltage reference circuit. However, in accordance with the present invention, the reference voltage $V_{REF}$ is generated by a reference voltage control circuit 130 in conjunction with a bandgap voltage reference circuit 112 to enable the switching regulator to provide programmable output current levels based on a single input signal, as will be described in more detail below.

The operation of switching regulator 120, with the exception of the generation of the reference voltage $V_{REF}$, is conventional and well known. Based on the error output signal from error amplifier 122 and the sense voltage $V_{SNS}$ (on node 126), PWM control circuit 124 drives power switch Q1 to either turn on the transistor or turn off the transistor. Power switch Q1 is turned on to apply energy to an inductor in the filter circuit 134 to allow the current through the inductor to build up. When the power switch is turned off, the voltage across the inductor reverses and charges are transferred onto an output capacitor of the filter circuit and the load which is photoflash 138. The output capacitor of the filter circuit 134 maintains a relatively constant output voltage.

Turning now to the implementation of programmable output current control in switching regulator 120. Switching regulator 120 includes a Brightness input terminal BRT (node 104) for receiving an input voltage $V_{BRIN}$ indicative of the desired output current level. In the present embodiment, the single input terminal BRT (or a single pin) is used to support three operation states of the switching regulator: Flash mode, Precharge mode and Torch mode. The three operation states correspond to two digital states (Flash mode and Precharge mode) and one analog state (Torch mode). The Flash mode corresponds to the maximum or full scale output current level of the switching regulator. The Precharge mode corresponds to a minimal output current level while the Torch mode corresponds to a reduced output current level of the switching regulator.

More specifically, the Brightness input terminal BRT receives a logical high signal (the $V_{IN}$ voltage) to indicate the selection of the Flash mode and a logical low signal (the ground voltage) to indicate the selection of the Precharge mode. Finally, the Brightness input terminal BRT receives a user-programmable analog voltage having a voltage value between the Vin voltage and the ground voltage to indicate the desired output current level to be used in the Torch mode.

In the present illustration, the programming of the Brightness input terminal BRT is realized through switches S1, S2 and a resistor $R_{Torch}$. The exact implementation of the programming circuit external to switching regulator 120 is not critical to the practice of the present invention and one of ordinary skill in the art would appreciate that other circuit configuration can be used to establish the programming conditions for switching 120 for driving the photoflash 128.

In the present embodiment, a switch S1 is connected between the input voltage $V_{IN}$ and node 104 which is the Brightness input terminal BRT. Switch S1 is controlled by a Flash control signal to cause switch S1 to close when the Flash mode is to be selected and to cause switch S1 to open when the Flash mode is not selected. When the Flash mode is selected, switch S1 is closed to drive the Brightness input terminal BRT (node 104) to the input voltage $V_{IN}$. Furthermore, a switch S2 is connected between the node 104 which is the Brightness input terminal BRT and the ground voltage (node 106). Switch S2 is controlled by a Precharge control signal to cause switch S2 to close when the Precharge mode is to be selected and to cause switch S2 to open when the Precharge mode is not selected. When the Precharge mode is selected, switch S2 is closed to drive the Brightness input terminal BRT (node 104) to the ground voltage. In this manner, the two digital states corresponding to the Flash and the Precharge operation modes are programmed onto input terminal BRT.

Resistor $R_{Torch}$ is connected in parallel with switch S2. When the Torch mode is to be selected, the Flash control signal and the Precharge control signal are both deasserted to cause both switches S1 and S2 to open. In the Torch mode, the Brightness input terminal BRT is left floating. However, as will be described in more detail below, the reference voltage control circuit 130, internal to switching regulator 120, provides a small current to the input terminal BRT such that the small current passes through resistor $R_{Torch}$ to develop an analog voltage level on Brightness input terminal BRT. The resistance value of resistor $R_{Torch}$ is selected by the user to program the desired output current level for use in the Torch mode. The voltage value $V_{BRIN}$ programmed by resistor $R_{Torch}$ ranges between the input voltage $V_{IN}$ and the ground voltage.

The reference voltage control circuit 130 of switching regulator 120 receives the voltage $V_{BRIN}$ from the Brightness input terminal BRT and also a bandgap voltage (approximately 1.25V) from bandgap reference circuit 112. The reference voltage control circuit 130 generates the reference voltage $V_{REF}$ indicative of the desired programming condition present on input terminal BRT. When the programmable reference voltage $V_{REF}$ is coupled to error amplifier 112 to form the control loop of switching regulator 120, the switching regulator will be operated to provide a switching output voltage $V_{SW}$, and ultimately an output voltage $V_{OUT}$, that conforms to the selected operation mode programmed on Brightness input terminal BRT.

In reference voltage control circuit 130, the voltage $V_{BRIN}$ is coupled to an error amplifier A1 to be compared with a brightness reference voltage $V_{BRREF}$. Brightness reference voltage $V_{BRREF}$ is a reference voltage generated by a voltage divider circuit coupled to the bandgap voltage. Specifically, resistors R1, R2 and R3 form a voltage divider circuit coupled between the bandgap voltage (from bandgap voltage reference circuit 112) and the ground voltage. Brightness reference voltage $V_{BRREF}$ (node 116) is stepped down from the bandgap voltage by resistor R1. The actual voltage value of brightness reference voltage $V_{BRREF}$ is determined by both the voltage divider of resistors R1, R2 and R3 and also by the control circuitry in circuit 130 pulling down on node 116, to be described in more detail below. When node 116 is not driven, brightness reference voltage $V_{BRREF}$ has a nominal voltage value of $[(R2+R3)/(R1+R2+R3)]*V_{BG}$ where $V_{BG}$ is the bandgap voltage (about 1.25V). In one embodiment, the nominal voltage value of brightness reference voltage $V_{BRREF}$ is about 1V. The operation of the control circuitry of reference voltage control circuit 130 pulls down on node 116 to allow programming of the reference voltage $V_{REF}$ so that the brightness reference voltage $V_{BRREF}$ (node 116) is either at its nominal voltage value or is at a voltage value less than the nominal voltage value.

Reference voltage control circuit 130 includes error amplifier A1, resistor R4, and a NMOS transistor M1 forming a precision active pulldown circuit. An active pulldown circuit operates to modify the voltage at its output node only by pulling down (sinking current). A precision active pulldown circuit is capable of modifying the voltage at its output node in finite increments. Thus, in circuit 130, the precision active pulldown circuit of error amplifier A1, resistor R4 and transistor M1 operates to pull down the output voltage on node 116 which is the brightness reference voltage $V_{BRREF}$. More specifically, error amplifier A1 receives the brightness input voltage $V_{BRIN}$ on its inverting input terminal and receives the brightness reference voltage $V_{BRREF}$ on its non-inverting input terminal. The error amplifier A1 is coupled to drive the gate terminal of NMOS transistor M1. Resistor R4 is coupled between node 116 and the drain terminal of transistor M1 while the source terminal of transistor M1 is connected to the ground voltage.

Error amplifier A1 and transistor M1 are configured in a follower configuration and is only active for pulling down (sinking current) the output node 116. Since NMOS transistor M1 is an inverting device, the inverting and non-inverting input terminals of error amplifier A1 are appropriately connected to achieve net negative feedback through the active pull down circuit. The precision active pulldown circuit of error amplifier A1, resistor R4 and transistor M1 drives node 116 which is the brightness reference voltage $V_{BRREF}$. Finally, the output voltage of the reference voltage control circuit 130, the reference voltage $V_{REF}$, is a voltage stepped down from the brightness reference voltage $V_{BRREF}$ and is taken at a node 118 between resistors R2 and R3.

Reference voltage control circuit 130 further includes a current source 114 providing a bias current $I_{BIAS}$ having a small current value to the Brightness input terminal BRT. Bias current $I_{BIAS}$ supplies a current to resistor $R_{TORCH}$ coupled to input terminal BRT to develop the analog input voltage $V_{BRIN}$ for the Torch mode operation, as will be explained in more detail below. Bias current $I_{BIAS}$ has a sufficiently small current value such that the current does not affect the operation of switching regulator 120 under the Flash, Precharge or Off mode.

The operation of the reference voltage control circuit 130 under the three operation states of switching regulator 120 will now be described. First, the operation under the Flash mode is described. When Flash mode is selected, the Flash control signal is asserted and switch S1 is closed (switch S2 is open) to connect the Brightness input terminal BRT (node 104) to the input voltage $V_{IN}$ which is the logical "high" level. The input voltage $V_{IN}$ is typically above 1V. When the brightness input voltage $V_{BRIN}$ is held high, the difference between the input voltage $V_{BRIN}$ and the brightness reference voltage $V_{BRREF}$ is small and the output voltage of error amplifier A1 swings to the ground voltage or near the ground voltage. As such, NMOS transistor M1 is turned off and node 116 is not driven. The brightness reference voltage $V_{BRREF}$ at node 116 is thus at its maximum value which is the nominal voltage value of $[(R2+R3)/(R1+R2+R3)]*V_{BG}$. In the present embodiment, the nominal voltage value of brightness reference voltage $V_{BRREF}$ is 1V. The reference voltage $V_{REF}$ is stepped down from the brightness reference voltage $V_{BRREF}$ and has a nominal voltage value of $[(R3)/(R1+R2+R3)]*V_{BG}$. The control loop of switching regulator 120 will operate to cause the switching regulator to provide a high current level required for the Flash mode.

Next, the operation under the Precharge mode is described. When Precharge mode is selected, the Precharge control signal is asserted and switch S2 is closed (switch S1 is open) to connect the Brightness input terminal BRT (node 104) to the ground voltage which is the logical "low" level. In actuality, it is sufficient to pull the Brightness input terminal BRT below about 200 mV. When the brightness input voltage $V_{BRIN}$ is held low, the difference between the input voltage $V_{BRIN}$ and the brightness reference voltage $V_{BRREF}$ is large and the output voltage of error amplifier A1 swings to the maximum voltage of switching regulator 120 which is the input voltage $V_{IN}$. As such, NMOS transistor M1 is fully turned on and node 116 is being pulled down through resistor R4.

When transistor M1 is fully turned on, the channel resistance of the transistor is significantly less than the resistance value of resistor R4. In essence, resistor R4 is connected in parallel with resistors R2 and R3 between node 116 and the ground voltage and influences the amount of voltage pulldown that is effectuated at node 116. The resistance value of resistor R4 is chosen to decrease the brightness reference voltage $V_{BRREF}$ sufficiently, thereby decreasing the reference voltage $V_{REF}$ sufficiently to allow the switching regulator 120 to operate at a low current mode for precharging the photoflash. In one embodiment, resistor R4 has a resistance value that decreases the brightness reference voltage $V_{BRREF}$ by 80% to 90% from its nominal vale. The reference voltage $V_{REF}$ at node 118 is accordingly decreased. The control loop of switching regulator 120 will operate to cause the switching regulator 120 to provide a low current level required for the Precharge mode.

Finally, the operation under the Torch mode is described. When Torch mode is selected, the Flash control signal and the Precharge control signal are both deasserted and switches S1 and S2 are open to let Brightness input terminal BRT go into tri-state high impedance (Hi-Z) mode. The Brightness input terminal BRT is not driven externally but rather current source 114 provides a small bias current $I_{BIAS}$ to the Brightness input terminal BRT. Bias current $I_{BIAS}$ is in fact continuously supplied and is present in the Flash or Precharge mode of operation. However, the connection to the input voltage or the ground voltage in the Flash or Precharge mode can readily overcome the influence of this small bias current.

To operate in Torch mode, a resistor $R_{TORCH}$, having a resistance value indicative of the desired output current level in the Torch mode, is coupled between the input terminal BRT and the ground voltage. By supplying bias current $I_{BIAS}$ to Brightness input terminal BRT, a voltage is developed at input terminal BRT having a voltage value given as: $V_{BRIN}(\text{Torch}) = I_{BIAS} \times R_{TORCH}$. Error amplifier A1 generates an output voltage indicative of the difference between the brightness reference voltage $V_{BRREF}$ and the brightness input voltage at Torch mode $V_{BRIN}(\text{Torch})$. Transistor M1 is driven to a state between fully turned on and fully turned off. Depending on the turn-on state of transistor M1, the channel resistance of transistor M1 will vary to impart a greater or lesser influence on the voltage divider of resistors R1–R3. The precision active pulldown circuit of error amplifier A1, transistor M1 and resistor R4 thus operates to pull down the brightness reference voltage $V_{BRREF}$ to the desired amount. The reference voltage $V_{REF}$ is pull down accordingly to set the desired output current level for the Torch mode, as programmed by resistor $R_{TORCH}$.

As thus constructed, the switching regulator of the present invention, incorporating the reference voltage control circuit, enables programmable output current control on a single pin. The reduced output current level in Torch mode can be set at any value between the fullscale current value for Flash mode and the minimal value for Precharge mode. The user only needs to select a resistor $R_{TORCH}$ having the appropriate resistance value. Specifically, the resistance value for $R_{TORCH}$ is given as: $R_{TORCH} = \%\text{Torch}/I_{BIAS}$, where % Torch represents the percentage voltage value relative to the full scale voltage desired for the Torch mode. In this manner, the switching regulator of the present invention enables complete control of the reference voltage $V_{REF}$ of the switching regulator and thereby enables complete control of the output current level during the Torch mode of operation In one embodiment, the input voltage $V_{IN}$ is 1V, and the Flash mode operates at 100% of the full scale output current while the Precharge mode operates at 20% of the full scale current. Resistor R1 is 25KΩ, resistor R2 is 90KΩ, resistor R3 is 10KΩ and resistor R4 is 5KΩ. Current $I_{BIAS}$ is 10 μA and the resistance value for resistor $R_{TORCH}$ is given as $R_{TORCH} = \%\text{Torch}/10\ \mu\text{A}$.

Figure 2:
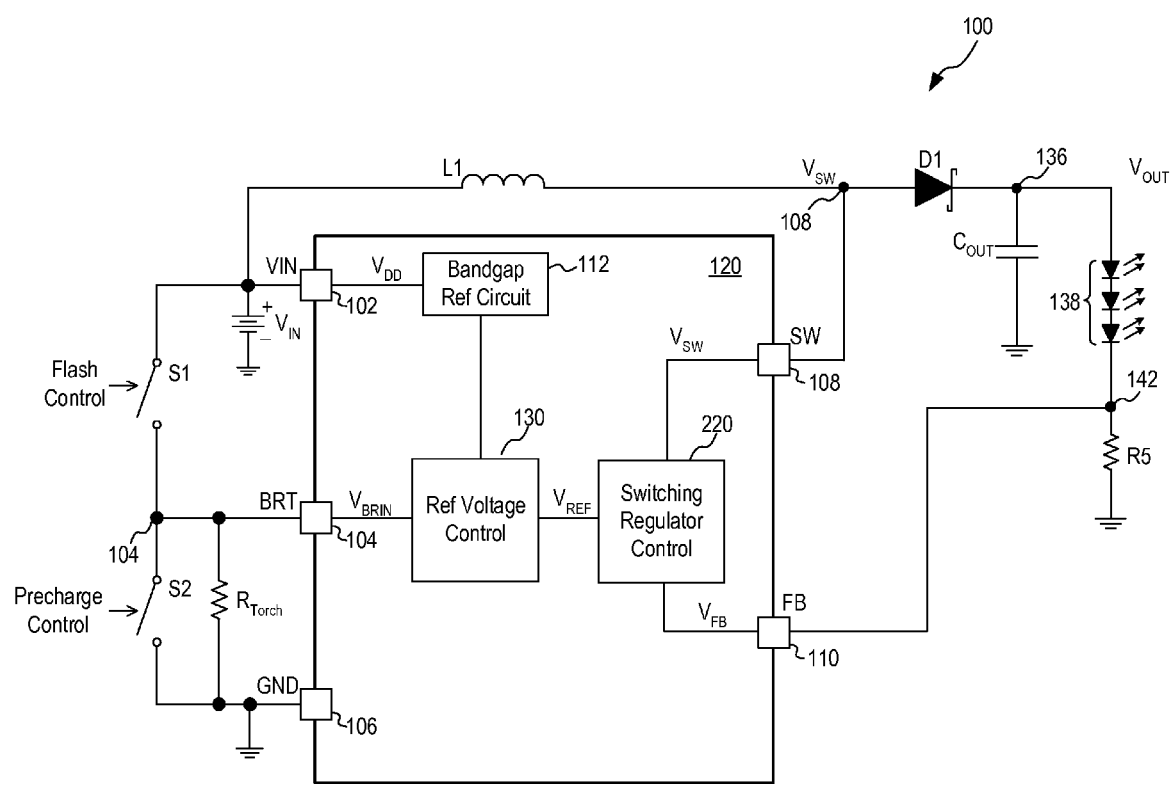
FIG. 2 is a circuit diagram of an exemplary photoflash LED driver system incorporating the switching regulator according to one embodiment of the present invention.

FIG. 2 is a circuit diagram of an exemplary photoflash LED driver system incorporating the switching regulator according to one embodiment of the present invention. FIG. 2 is provided to illustrate one exemplary of the filter circuit and one exemplary embodiment of the photoflash that can be used with the switching regulator of the present invention. The configuration and components used in FIG. 2 is illustrative only and is not intended to limit the present invention thereto. In FIGS. 1 and 2, like elements are given like reference numerals to simplify the discussion. Referring to FIG. 2, switching regulator 120 is shown with a simplified internal block diagram where switching regulator control circuit 220 includes all control circuitry of the switching regulator of FIG. 1 not included in circuit 130.

In the present illustration, switching regulator 120 is configured as a boost PWM switching regulator. The output filter circuit includes an inductor L1 connected between the input voltage $V_{IN}$ and the switching output voltage $V_{SW}$. A Zener diode D1 (or a p-n junction diode) is coupled between the switching output voltage $V_{SW}$ and the output voltage $V_{OUT}$. An output capacitor $C_{OUT}$ is connected between the output voltage $V_{OUT}$ and the ground voltage. Inductor L1, diode D1 and output capacitor $C_{OUT}$ operate in conjunction to generate from the switching output voltage an output voltage $V_{OUT}$ having substantially constant magnitude.

In the present illustration, switching regulator 120 is disposed to drive photoflash 138 consisting of a bank of 3 white light emitting diodes (LEDs). LEDs 138 are connected in series with the anode of the first LED connected to the output voltage $V_{OUT}$ and the cathode of the last LED connected to resistor R5. A feedback voltage is developed at node 142 between LEDs 138 and resistor R5 to be fed back to switching regulator 120 as feedback voltage $V_{FB}$. The use of white LEDs as the photoflash is illustrative only. The switching regulator of the present invention can be applied to drive other types of photoflashes.

In the above descriptions, the switching regulator of the present invention is applied in a photoflash application. The switching regulator of the present invention can be applied to a variety of applications where a programmable output current is desired. In general terms, the brightness input terminal BRT can be generalized as an output current program terminal and brightness input voltage $V_{BRIN}$ can be generalized as the program input voltage. The reference voltage of the switching regulator of the present invention is thus programmed in accordance with the voltage value of the program input voltage provided on the output current program terminal. The switching regulator of the present invention provides significant improvement over conventional circuits by using a single program pin to enable complete control of the output current level.

Furthermore, in the above descriptions, a current source 114 is used to provide a small bias current to develop a voltage across the resistor $R_{TORCH}$ used in the Torch mode to indicate the desired output current level. Current source 114 is not critical to the practice of the present invention and may be omitted in other embodiments of the present invention. One of ordinary skill in the art would appreciate that other methods for providing a bias current to resistor $R_{TORCH}$ may be used, including using a current source external to switching regulator integrated circuit. The exact manner of providing a bias current to resistor $R_{TORCH}$ is not critical to the practice of the present invention as long as a voltage indicative of the desired program output current level is provided to the output current program terminal (that is, input terminal BRT).

The above detailed descriptions are provided to illustrate specific embodiments of the present invention and are not intended to be limiting. Numerous modifications and variations within the scope of the present invention are possible. For example, the transistor types and the polarities of the transistors (e.g. NPN vs. PNP or NMOS vs. PMOS) can be changed as long as the control voltage polarities are changed accordingly. The present invention is defined by the appended claims.

We claim:

1. A switching regulator receiving an input voltage and including a power switch controlled by a control loop to generate a switching output voltage and an output circuit coupled to receive the switching output voltage and to supply an output current at a regulated output voltage to a load, the switching regulator comprising:
   a first input terminal receiving a program input voltage indicative of a desired output current to be provided to the load, the program input voltage having voltages values between and including the input voltage and a first power supply reference voltage;
   a voltage divider comprising first, second and third resistors connected in series between a first reference voltage and the first power supply reference voltage, the voltage divider providing a second reference voltage at a first node between the first and second resistors and a third reference voltage at a second node between the second and third resistors; and
   a precision active pulldown circuit coupled to receive the program input voltage and operative to pull down the second reference voltage at the first node in response to the program input voltage,
   wherein the third reference voltage is used in the control loop of the switching regulator to control the output current of the switching regulator in response to the program input voltage.

2. The switching regulator of claim 1, wherein the precision active pull down circuit comprises:
   an error amplifier having a first input terminal coupled to receive the program input voltage and a second input terminal coupled to the first node to receive the second reference voltage, and an output terminal providing an output voltage responsive to the difference between the program input voltage and the second reference voltage;
   a transistor having a control terminal driven by the output voltage of the error amplifier, a first current handling terminal coupled to the first power supply reference voltage and a second current handling terminal; and
   a fourth resistor coupled between the first node and the second current handling terminal of the transistor.

3. The switching regulator of claim 1, wherein the second reference voltage has a nominal voltage value being a divided down voltage of the first reference voltage, and the precision active pulldown circuit operates to decrease the voltage value of the second reference voltage from the nominal voltage value in response to the program input voltage.

4. The switching regulator of claim 1, wherein the control loop of the switching regulator comprises:
   a second error amplifier having a first input terminal coupled to receive the third reference voltage and a second input terminal coupled to receive a voltage indicative of the regulated output voltage, and an output terminal providing an error voltage responsive to the difference between the third reference voltage and the voltage indicative of the regulated output voltage; and
   a PWM control circuit coupled to receive the error voltage and a voltage indicative of a current flowing through the power switch, the PWM control circuit driving the power switch to cause the power switch to generate the switching output voltage.

5. The switching regulator of claim 1, wherein the first reference voltage comprises a bandgap voltage.

6. The switching regulator of claim 1, wherein the first power supply reference voltage comprises a ground voltage.

7. The switching regulator of claim 2, wherein the transistor comprises an NMOS transistor.

8. The switching regulator of claim 1, further comprising:
   a current source providing a bias current to the first input terminal.

9. The switching regulator of claim 8, wherein at least one voltage value of the program input voltage is generated by supplying the bias current to a fifth resistor coupled to the first input terminal.

10. The switching regulator of claim 1, wherein the switching regulator is disposed to operate in one of three modes, a first mode indicated by the program input voltage having a voltage value near the input voltage, a second mode indicated by the program input voltage having a voltage value near the first power supply reference voltage, and a third mode indicated by the program input voltage developed when the bias current is supplied to the fifth resistor.

11. The switching regulator of claim 10, wherein the switching regulator provides a maximum level of output current when operated in the first mode, a minimal level of output current when operated in the second mode and a reduced level of output current when operated in the third mode, the reduced level being between the maximum level and the minimal level.

12. The switching regulator of claim 11, wherein the switching regulator is coupled to drive a photoflash as the load and the first mode corresponds to a flash mode, the second mode corresponds to a precharge mode and the third mode corresponds to a torch mode of operation for the photoflash.

* * * * *